United States Patent
Miyake

(10) Patent No.: US 11,130,484 B2
(45) Date of Patent: Sep. 28, 2021

(54) CONTROL DEVICE AND CONTROL METHOD FOR HYBRID VEHICLE

(71) Applicant: TOYOTA JIDOSHA KABUSHIKI KAISHA, Aichi-ken (JP)

(72) Inventor: Shota Miyake, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 251 days.

(21) Appl. No.: 16/251,106

(22) Filed: Jan. 18, 2019

(65) Prior Publication Data

US 2019/0256081 A1 Aug. 22, 2019

(30) Foreign Application Priority Data

Feb. 16, 2018 (JP) .............................. JP2018-026203

(51) Int. Cl.
*B60W 20/19* (2016.01)
*B60W 10/06* (2006.01)
(Continued)

(52) U.S. Cl.
CPC ............ *B60W 20/19* (2016.01); *B60W 10/06* (2013.01); *B60W 10/08* (2013.01); *B60W 20/16* (2016.01); *B60K 6/445* (2013.01); *B60W 30/188* (2013.01); *B60W 2510/0619* (2013.01); *B60W 2510/0657* (2013.01); *B60W 2510/083* (2013.01); *B60W 2540/10* (2013.01); *B60W 2710/0622* (2013.01);
(Continued)

(58) Field of Classification Search
CPC ...... B60W 10/06; B60W 10/08; B60W 20/16; B60W 20/19; B60W 2510/0619; B60W 2510/0657; B60W 2510/083; B60W 2540/10; B60W 2710/083; B60W 2710/0622; B60W 2710/0666; B60W 2710/0672; B60W 30/188; B60W 20/10; B60W 20/15; B60K 6/445; Y02T 10/40; Y02T 10/62; F02D 41/1454; F02D 41/1401
USPC ......................................................... 701/22
See application file for complete search history.

(56) References Cited

U.S. PATENT DOCUMENTS 9,150,217 B2 * 10/2015 Hosoe .................... B60K 6/445
9,604,528 B2 * 3/2017 Kinoshita ............. F02P 5/1504
(Continued)

FOREIGN PATENT DOCUMENTS

DE 102008042544 A1 4/2010
DE 102012201111 A1 8/2013
(Continued)

*Primary Examiner* — Rachid Bendidi
*Assistant Examiner* — Michael R Smith
(74) *Attorney, Agent, or Firm* — Hauptman Ham, LLP

(57) ABSTRACT

A control device for a hybrid vehicle calculates a required drive force based on an accelerator position. The control device also calculates a required torque of the engine based on the required drive force. The control device further calculates a target torque for the engine by subjecting the required torque to a gradual change process for lessening a change in a value and performs an engine control such that an engine torque becomes equal to the target torque. The control device also performs a torque control on the motor such that a drive force of the hybrid vehicle becomes equal to the required drive force in a state in which the engine torque is equal to the target torque.

15 Claims, 4 Drawing Sheets

(51) Int. Cl.
  *B60W 10/08* (2006.01)
  *B60W 20/16* (2016.01)
  *B60W 30/188* (2012.01)
  *B60K 6/445* (2007.10)

(52) U.S. Cl.
  CPC ............... *B60W 2710/0666* (2013.01); *B60W 2710/0672* (2013.01); *B60W 2710/083* (2013.01)

(56) References Cited

U.S. PATENT DOCUMENTS

| | | |
|---|---|---|
| 2007/0266711 A1 | 11/2007 | Falkenstein et al. |
| 2011/0224856 A1 | 9/2011 | Falkenstein |
| 2015/0203100 A1* | 7/2015 | Whitney .................. B60K 6/52 701/22 |
| 2016/0244048 A1 | 8/2016 | Sato |
| 2017/0021817 A1* | 1/2017 | Kumazaki ............. F02D 41/023 |

FOREIGN PATENT DOCUMENTS

| | | |
|---|---|---|
| JP | 2006-158154 A | 6/2006 |
| JP | 2016-155484 A | 9/2016 |
| JP | 201163089 A | 3/2020 |

* cited by examiner

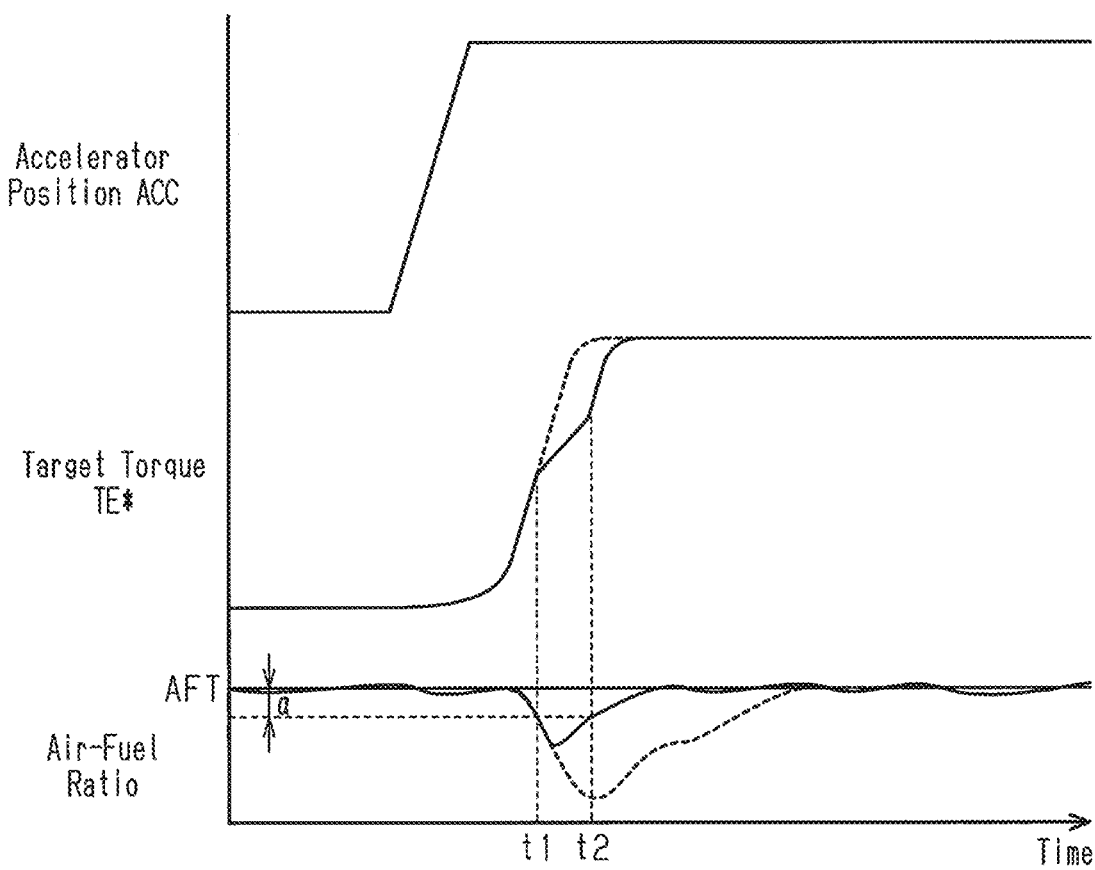

CONTROL DEVICE AND CONTROL METHOD FOR HYBRID VEHICLE

RELATED APPLICATIONS

The present application claims priority of Japanese Application Number 2018-026203, filed on Feb. 16, 2018, the disclosure of which is hereby incorporated by reference herein in its entirety.

BACKGROUND

The present disclosure relates to a control device and a control method for a hybrid vehicle.

A device described in Japanese Laid-Open Patent Publication No. 2006-158154 is conventionally known as a control device for a hybrid vehicle including an engine and a motor as drive source for traveling. The control device described in the aforementioned document first calculates a required drive force for a vehicle as a whole based on the accelerator position. The control device then controls the torque of the engine and the torque of the motor such that the sum of the drive force produced by the engine and the drive force generated by the motor becomes equal to the required drive force. Also, the control device performs a gradual change process (a smoothing process) when calculating the required drive force. The gradual change process limits change in the required drive force when a sudden change occurs in the accelerator position.

SUMMARY

It is an objective of the present disclosure to provide a control device and a control method for a hybrid vehicle capable of limiting deterioration of emission in an engine without decreasing the responsivity of drive force.

Examples of the present disclosure will now be described.

Example 1: A control device for a hybrid vehicle is provided. The hybrid vehicle includes an engine and a motor as drive sources for traveling. The control device includes a required drive force calculating section that is configured to calculate a required drive force based on an accelerator position, a required torque calculating section that is configured to calculate a required torque of the engine based on the required drive force, a gradual change processing section that is configured to calculate a target torque for the engine by subjecting the required torque to a gradual change process for lessening a change in a value, an engine controlling section that is configured to perform an engine control such that an engine torque becomes equal to the target torque, and a motor controlling section that is configured to perform a torque control on the motor such that a drive force of the hybrid vehicle becomes equal to the required drive force in a state in which the engine torque is equal to the target torque.

In the above-described control device for a hybrid vehicle, the value obtained by subjecting the required torque, which is calculated from the required drive force, to the gradual change process is the target torque. The engine control is performed such that the engine torque changes in correspondence with the target torque. By ensuring sufficient limitation of the change in the target torque through the gradual change process, the deterioration of emission caused by a sudden change in the engine torque is limited.

On the other hand, the control device controls the torque of the motor, based on the required drive force calculated from the accelerator position and the target torque for the engine, such that the drive force of the hybrid vehicle becomes equal to the required drive force. That is, the motor is subjected to torque control and thus caused to produce the drive force corresponding to the difference between the drive force generated by the engine, which is controlled based on the target torque, and the required drive force. Therefore, even if the engine torque changes after delay with respect to change in the required drive force, the drive force of the vehicle changes in a manner following the required drive force. As a result, the above-described control device for a hybrid vehicle limits deterioration of emission of the engine without decreasing the responsivity of the drive force.

If a sudden change occurs in the engine torque, the air-fuel ratio may become destabilized and thus degrade emission of the engine. To avoid this, change in the required drive force must be limited through the gradual change process to such an extent that the deterioration of emission caused by a sudden change in the engine torque does not occur. This, in turn, lowers the response of the drive force of the hybrid vehicle with respect to the driver's manipulation of the accelerator pedal. This problem is, however, solved by the above-described configuration.

If the gradual change process cannot sufficiently lessen change in the value, the above-described control device cannot be allowed to sufficiently limit the deterioration of emission caused by a sudden change in the engine torque. In this regard and in accordance with Example 2, the control device of Example 1 further includes a correction processing section that is configured to correct the target torque based on a difference between a target value of an air-fuel ratio of the engine and a detection value of the air-fuel ratio. That is, if the amount of air flowing into each cylinder cannot change in a manner following the sudden change in the target torque, the target value of the air-fuel ratio of the engine becomes different from the detection value of the air-fuel ratio. Therefore, by using the difference between the target value and the detection value of the air-fuel ratio, the target torque can be corrected to decrease the difference.

Example 3: A control method for a hybrid vehicle is provided that performs the various processes described in Examples 1 and 2.

Example 4: A non-transitory computer readable memory medium is provided that stores a program that causes a processor to perform the various processes described in Examples 1 and 2.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings:

FIG. 6 is a timing diagram representing changes in the accelerator position, the required drive force, the target torque, and the vehicle acceleration at the time of vehicle acceleration in the hybrid vehicle in FIG. 1 when the target torque is corrected in correspondence with the air-fuel ratio.

DETAILED DESCRIPTION

A control device for a hybrid vehicle according to an embodiment of the present disclosure will now be described with reference to FIGS. 1 to 6.

Figure 1:
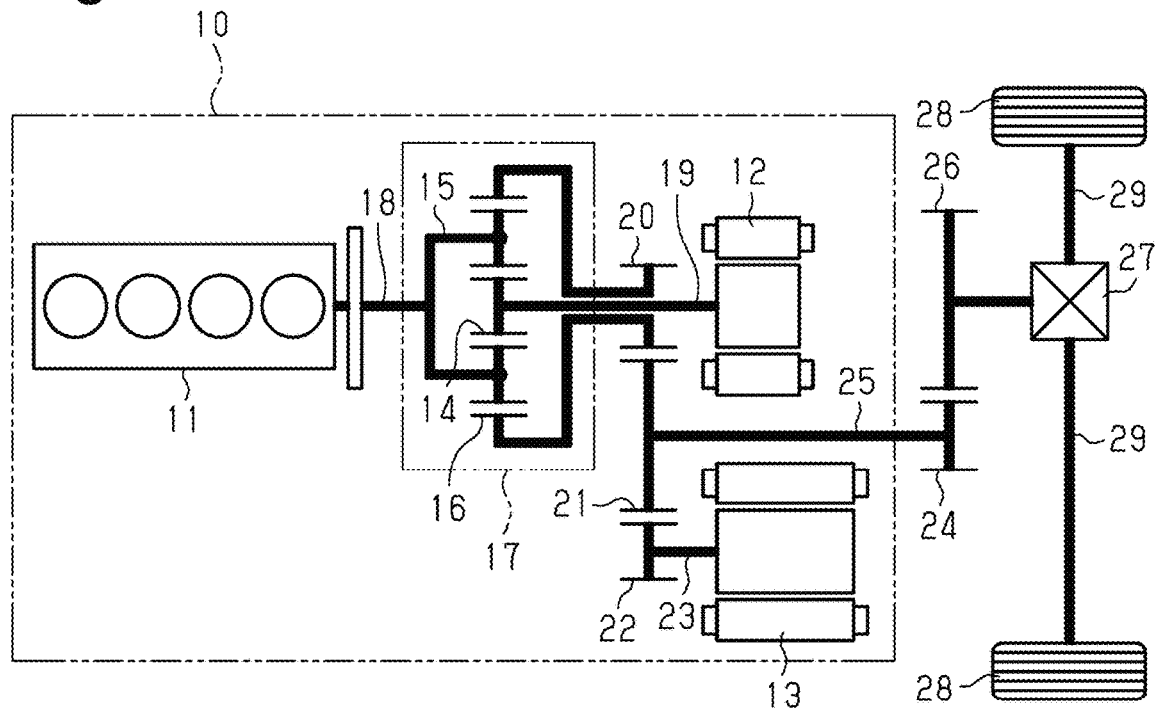
FIG. 1 is a diagram schematically showing the configuration of the drive system of a hybrid vehicle that employs a control device according to an embodiment of the present disclosure.

As illustrated in FIG. 1, a hybrid vehicle employing the control device of the present embodiment has a power unit 10 to generate drive force for traveling. The power unit 10 has an engine 11 and two, first and second, motor-generators 12 and 13 as drive sources for traveling. The first and second motor-generators 12, 13 are each configured to be switchable, depending on the circumstances, between operation as a power generator that generates electric power by receiving drive power from the exterior and operation as an electric motor that generates drive power by receiving electric power.

The power unit 10 has a planetary gear mechanism 17 having three rotary elements, that is, a sun gear 14, a planetary carrier 15, and a ring gear 16. A crankshaft 18 of the engine 11 and a rotary shaft 19 of the first motor-generator 12 are joined to the planetary carrier 15 and the sun gear 14 of the planetary gear mechanism 17, respectively, each in an integrally rotatable manner. A counter drive gear 20 is formed integrally with the ring gear 16 of the planetary gear mechanism 17. A counter driven gear 21 is meshed with the counter drive gear 20. A reduction gear 22 is meshed with the counter driven gear 21. A rotary shaft 23 of the second motor-generator 13 is joined to the reduction gear 22 in an integrally rotatable manner.

The counter driven gear 21 of the power unit 10, which has the above-described configuration, is joined to a final drive gear 24 in an integrally rotatable manner. In the present embodiment, the shaft that couples the counter driven gear 21 and the final drive gear 24 together serves as an output shaft 25 of the power unit 10. A final driven gear 26 is meshed with the final drive gear 24. Drive shafts 29 of left and right wheels 28 are joined to the final driven gear 26 through a differential mechanism 27.

Figure 2:
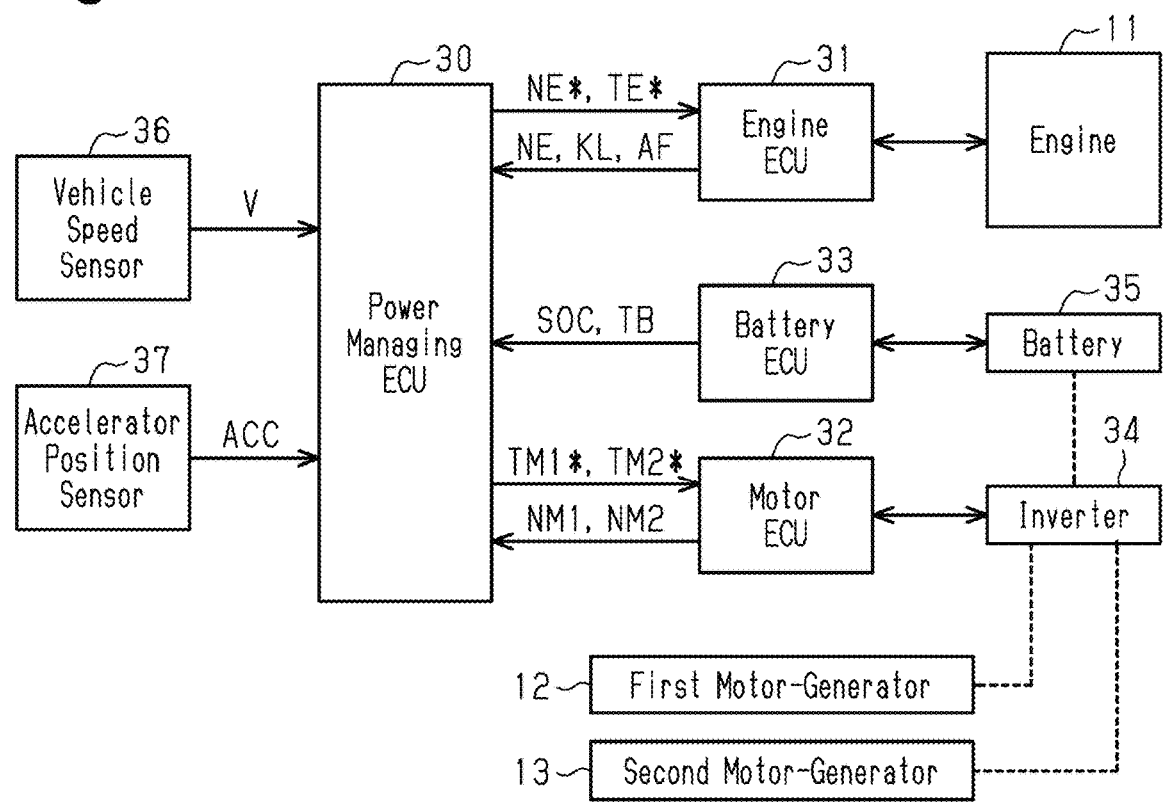
FIG. 2 is a diagram schematically showing the configuration of the control device in the hybrid vehicle of FIG. 1.

FIG. 2 shows the configuration of the control device for a hybrid vehicle of the present embodiment. Referring to the diagram, the control device includes four electronic control units (four ECUs), which are a power managing ECU 30, an engine ECU 31, a motor ECU 32, and a battery ECU 33. The power managing ECU 30 manages electric power and drive power in the vehicle as a whole. The engine ECU 31 controls the engine 11. The motor ECU 32 controls the torque of each of the first and second motor-generators 12, 13. The battery ECU 33 manages a battery 35. In the present embodiment, the engine ECU 31 corresponds to an engine controlling section, and the motor ECU 32 corresponds to a motor controlling section.

Also referring to FIG. 2, the first and second motor-generators 12, 13 are electrically connected to the battery 35 through an inverter 34. The inverter 34 regulates the amount of electric power transmitted between the first motor-generator 12 and the battery 35 and the amount of electric power transmitted between the second motor-generator 13 and the battery 35.

Detection results of sensors that detect traveling conditions of the vehicle, such as a vehicle speed sensor 36 and an accelerator position sensor 37, are input to the power managing ECU 30. The vehicle speed sensor 36 detects the traveling speed of the hybrid vehicle (the vehicle speed V). The accelerator position sensor 37 detects the amount of accelerator pedal manipulation by the driver (the accelerator position ACC). Also, information representing operating conditions of the engine 11, such as the engine speed NE, the engine load KL, and a detection value of the air-fuel ratio (hereinafter, referred to as a detected air-fuel ratio AF), are input to the power managing ECU 30. Further, the motor ECU 32 inputs information representing operating conditions of the motor-generators, such as the numbers of rotation of the first and second motor-generators 12, 13 (the first motor speed NM1 and the second motor speed NM2), to the power managing ECU 30. Also, the battery ECU 33 inputs information representing conditions of the battery 35, such as the state of charge SOC and the battery temperature TB, to the power managing ECU 30.

Based on the input information, the power managing ECU 30 calculates a target engine speed NE* and a target torque TE*, that is, the target value of the engine speed NE and the target value of the engine torque TE, respectively, and then outputs the target engine speed NE* and the target torque TE* to the engine ECU 31. The power managing ECU 30 also calculates a first motor torque command TM1* and a second motor torque command TM2*, which are the command value of the torque generated by the first motor-generator 12 and the command value of the torque generated by the second motor-generator 13, respectively, and outputs the first motor and second motor torque commands TM1* and TM2* to the motor ECU 32. Then, the engine ECU 31 controls the engine 11 based on the target engine speed NE* and the target torque TE* and the motor ECU 32 controls the inverter 34 based on the first motor torque command TM1* and the second motor torque command TM2*. In these manners, the vehicle is driven and controlled. Specifically, the engine ECU 31 regulates the intake air amount of the engine 11 such that the amount of intake air flowing into each cylinder (the cylinder inflow air amount) reaches the amount necessary for producing the engine torque TE corresponding to the target torque TE*. The engine ECU 31 then calculates the fuel injection amount that is necessary for causing the air-fuel ratio to reach the target value of the air-fuel ratio with respect to the regulated cylinder inflow air amount and thus performs fuel injection control on the engine 11. In this manner, the engine ECU 31 carries out engine control such that the engine torque TE becomes equal to the target torque TE*.

Figure 3:
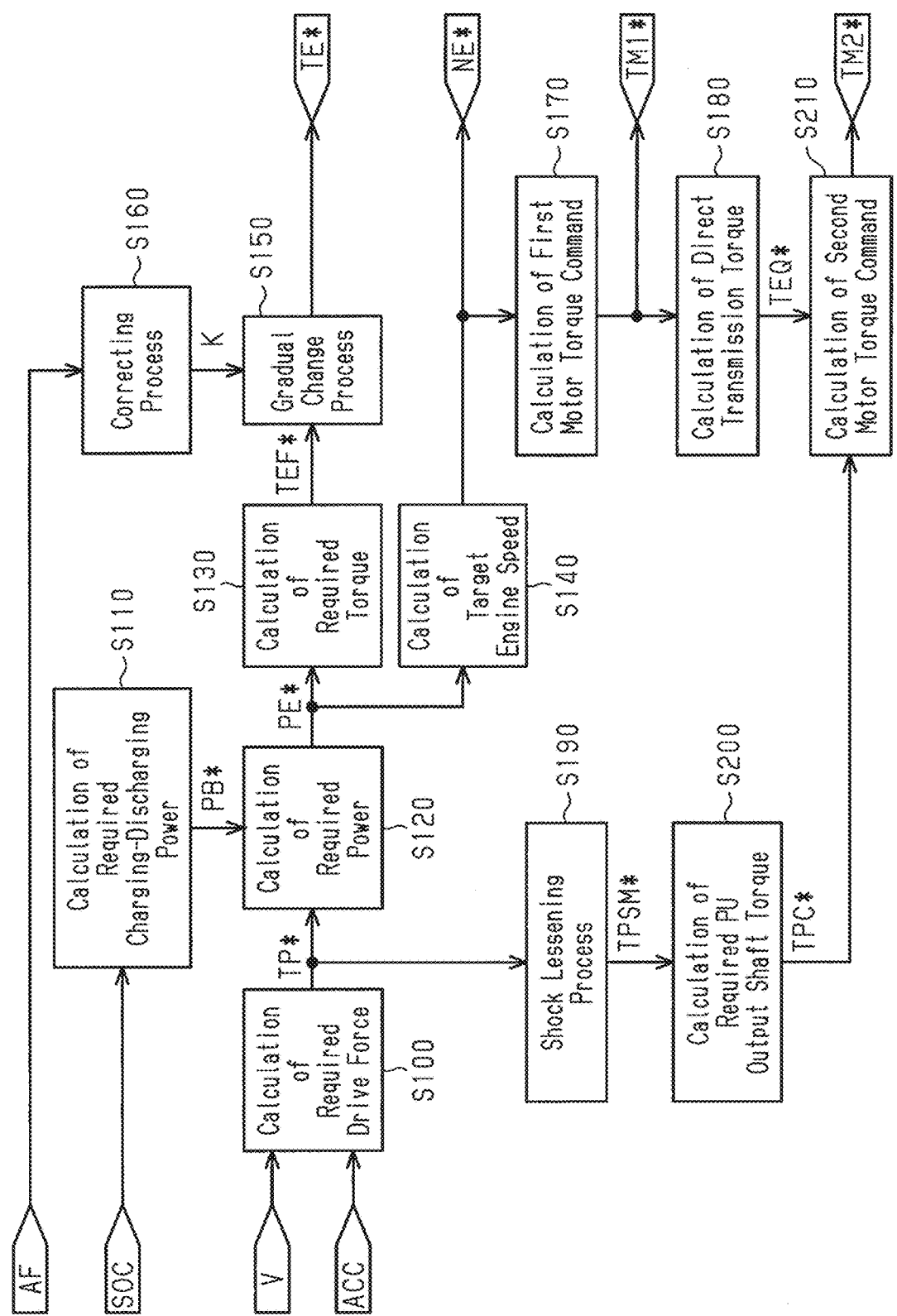
FIG. 3 is a block diagram representing the configuration by means of which the control device controls the vehicle drive force in the hybrid vehicle of FIG. 1.

FIG. 3 represents a procedure performed by the power managing ECU 30 to drive and control the vehicle. According to the procedure, the target engine speed NE*, the target torque TE*, the first motor torque command TM1*, and the second motor torque command TM2* are calculated. The power managing ECU 30 performs the procedure of FIG. 3 repeatedly at predetermined calculation cycles during activation of the vehicle.

To drive and control the vehicle, a required drive force TP* is calculated, in Step S100, based on the vehicle speed V and the accelerator position ACC. The required drive force TP* is the request value of the drive force of the vehicle.

Also, in Step S110, a required charging-discharging power PB* is calculated. The required charging-discharging power PB* is the request value of the drive force that is used in charging-discharging control on the battery 35. The charging-discharging control is carried out to maintain the charging amount SOC at a predetermined control target. Specifically, when the charging amount SOC is greater than the control target, the power running of the second motor-generator 13 is performed to discharge the battery 35. If the charging amount SOC is smaller than the control target, the regenerative operation of the second motor-generator 13 is performed to charge the battery 35. In the charging-discharging control, the required charging-discharging power PB* is a positive value when the power running of the second motor-generator 13 should be carried out and is a negative value when the regenerative operation of the second motor-generator 13 should be performed.

Then, in Step S120, the difference between the required drive force TP* and the required charging-discharging power PB* is calculated as a required power PE*. The required power PE* is the request value of the drive force generated by the engine 11. Based on the required power PE*, the required torque TEF*, that is, the request value of the engine torque TE, is calculated in Step S130. Also, the target engine speed NE* for the engine 11 is calculated in Step S140. The required torque TEF* and the target engine speed NE* represent such an engine torque TE and such an engine speed NE, respectively, that the engine output necessary for generating the drive force corresponding to the required power PE* can be produced in a state in which fuel efficiency and exhaust performance are optimal.

In Step S150, the required torque TEF* is subjected to a gradual change process through which change of the value is lessened. The obtained value is determined as the target torque TE*. In the present embodiment, the target torque TE* is calculated by being updated to satisfy the equation (1) in the gradual change process. In the equation (1), TE*[i−1] and TE*[i] represent the pre-update value of the target torque and the post-update value of the target torque, respectively. The value K represents a constant used to determine the degree of lessening change in the value. The greater the constant K, the smaller the change in the target torque TE* with respect to the change in the required torque TEF*. Through such calculation, the target torque TE* is determined as a value that changes after delay in response with respect to change in the accelerator position ACC.

$$TE^*[i]=\{TEF^*+(K-1)TE^*[i-1]\}/K \quad (1)$$

Specifically, in the present embodiment, the constant K in the equation (1) is set based on the detected air-fuel ratio AF in a correcting process of Step S160. The constant K is set to a greater value when the difference between the target value of the air-fuel ratio of the engine 11 (hereinafter, referred to as the target air-fuel ratio AFT) and the detected air-fuel ratio AF is greater than or equal to a predetermined value α than when the difference is smaller than the value α. Therefore, in the gradual change process of Step S150, the target torque TE* is calculated such that the change in the target torque TE* becomes more limited, that is, the delay in response with respect to the accelerator position ACC becomes greater, when the aforementioned difference is greater than or equal to the value α than when the difference is smaller than the value α. Although the target torque TE* is not directly manipulated in the aforementioned correcting process, the target torque TE* is changed, as a consequence, in correspondence with the difference between the target air-fuel ratio AFT and the detected air-fuel ratio AF. That is, the correcting process is substantially a process of correcting the target torque TE* in correspondence with the difference between the target air-fuel ratio AFT and the detected air-fuel ratio AF.

In Step S170, the first motor torque command TM1* is calculated based on the target engine speed NE*. The first motor torque command TM1* is the torque of the first motor-generator 12 that is necessary for causing the engine speed NE to reach the target engine speed NE*. In Step S180, a direct transmission torque TEQ* is calculated. The direct transmission torque TEQ* is the torque transmitted from the engine 11 to the output shaft 25 of the power unit 10 in a state in which the engine 11 is operated in correspondence with the target engine speed NE* and the target torque TE* and the first motor-generator 12 is driven in correspondence with the first motor torque command TM1*.

Meanwhile, in Step S190, the required drive force TP* is subjected to a shock lessening process and thus determined as a final required drive force TPSM*. In the shock lessening process, the final required drive force TPSM* is calculated by performing a guarding process on the upper and lower limits of the change rate of the required drive force TP* to such an extent that the torque shock caused by a sudden change in the drive force does not occur.

In Step S200, a required PU output shaft torque TPC* is calculated based on the final required drive force TPSM*. The required PU output shaft torque TPC* is the torque of the output shaft 25 of the power unit 10 when the drive force corresponding to the final required drive force TPSM* is produced. Then, in Step S210, the difference between the required PU output shaft torque TPC* and the direct transmission torque TEQ* is calculated as the second motor torque command TM2*, which is the command value of the torque of the second motor-generator 13. Specifically, the second motor torque command TM2* represents the torque transmitted from the second motor-generator 13 to the output shaft 25 through the reduction gear 22 and the counter driven gear 21.

Specifically, to lessen the torque shock, highly responsive torque regulation is necessary. In this regard, in the present embodiment, the target torque TE* for the engine 11 is calculated from the required drive force TP* and the second motor torque command TM2* is calculated from the final required drive force TPSM*, which is obtained by subjecting the required drive force TP* to the shock lessening process. That is, the torque regulation for lessening the torque shock is carried out by the second motor-generator 13. The second motor-generator 13 is capable of performing torque regulation with higher responsivity than the engine 11.

An operation and advantages of the present embodiment will now be described.

A sudden change in the engine torque may destabilize the air-fuel ratio and thus degrade the emission of the engine 11. In the present embodiment, the gradual change process determines the target torque TE* as a value with limited change such that, even at the time of a sudden change in the accelerator position ACC, a sudden change in the engine torque does not occur. This limits deterioration of emission.

In contrast, in a certain case of controlling the drive force of a vehicle, for example, the gradual change process for obtaining the target torque TE* may not be performed. In this case, the required torque TEF*, which is calculated from the required drive force TP*, is set directly to the target torque TE*. Even in the case, if the required drive force TP* is determined as a value with sufficiently limited change, that is, the gradual change process is carried out to obtain the required drive force TP*, instead of the target torque TE*, the deterioration of emission caused by a sudden change in the engine torque is limited.

Figure 4:
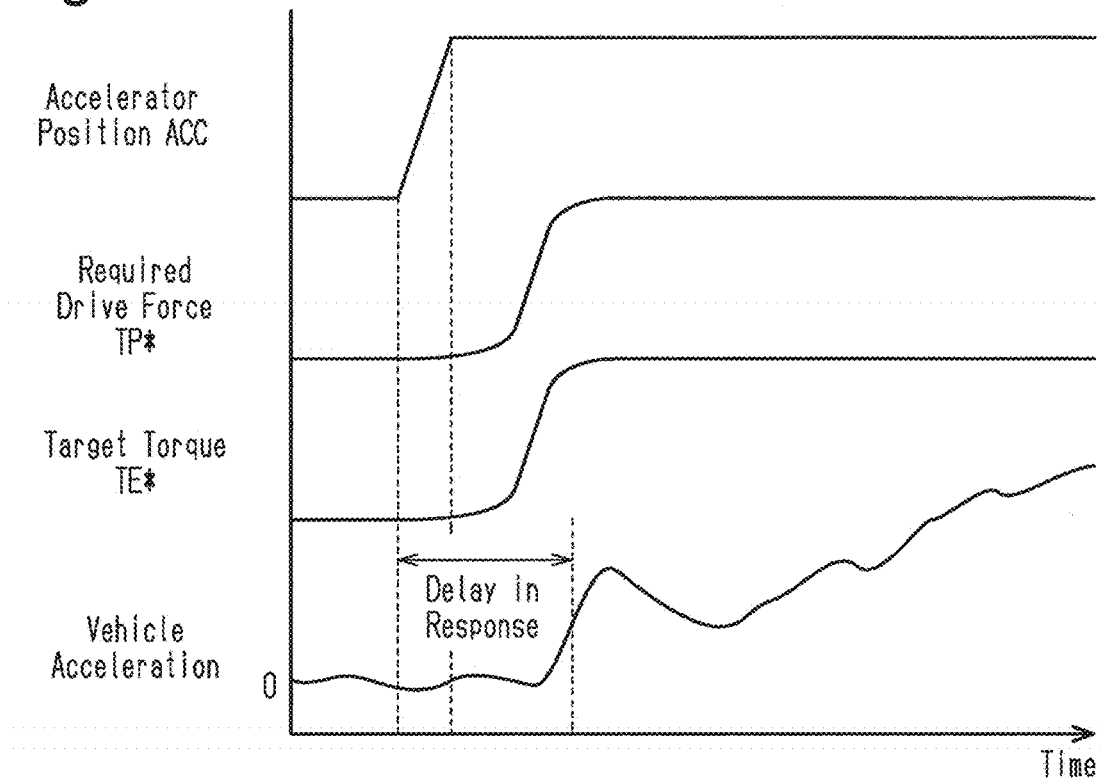
FIG. 4 is a timing diagram representing changes in the accelerator position, the required drive force, the target torque, and the vehicle acceleration at the time of vehicle acceleration in a comparative example.

FIG. 4 represents changes in the accelerator position ACC, the required drive force TP*, the target torque TE*, and the vehicle acceleration at the time the accelerator pedal is abruptly depressed in the above-described case. In this case, to limit the change in the target torque TE* to such an extent that deterioration of emission does not occur, the required drive force TP* must be set as a value with change limited to the same extent as the target torque TE*. However, this delays the change in the required drive force TP* with respect to the change in the accelerator position ACC, thus correspondingly increasing the delay amount of response of the vehicle drive force with respect to the driver's manipulation of the accelerator pedal.

Figure 5:
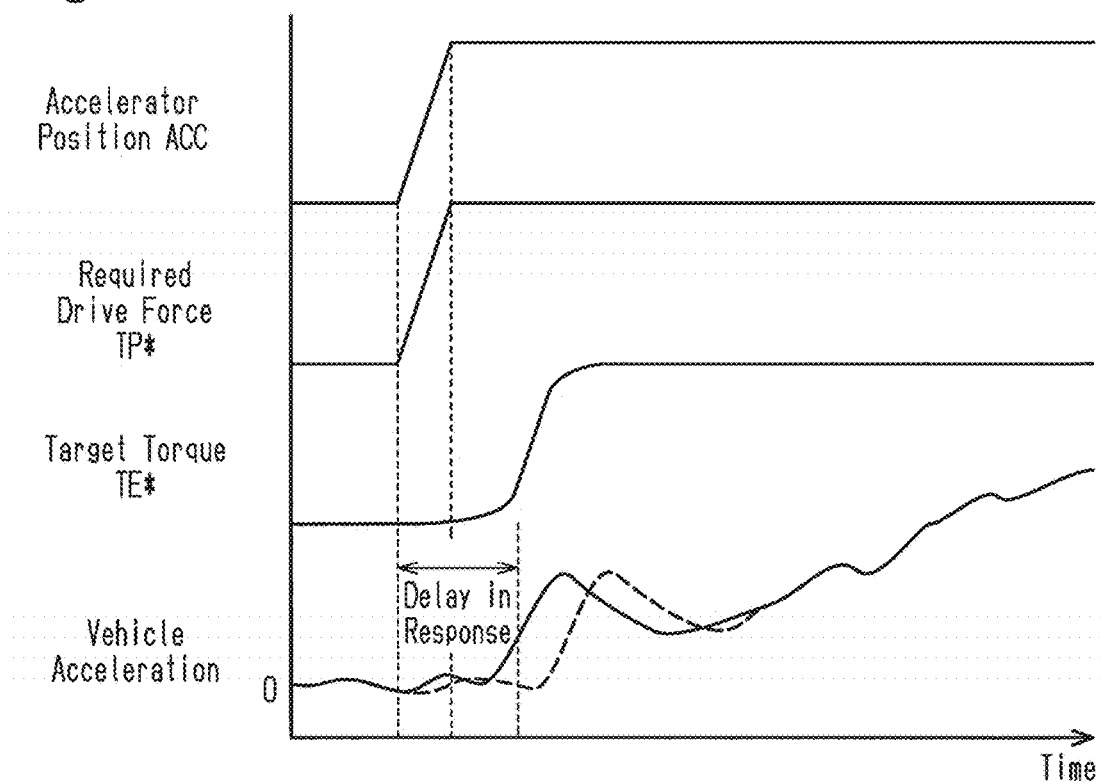
FIG. 5 is a timing diagram representing changes in the accelerator position, the required drive force, the target torque, and the vehicle acceleration in the control device for a hybrid vehicle of FIG. 1 at the time of vehicle acceleration.

FIG. 5 represents changes in the accelerator position ACC, the required drive force TP*, the target torque TE*, and the vehicle acceleration in the control device of the present embodiment at the time of abrupt depression of the accelerator pedal. The graph represents a change in the vehicle acceleration in the case of FIG. 4 by a broken line for the purpose of comparison.

Also in the present embodiment, the gradual change process is performed to determine the target torque TE* for the engine 11 as a value that changes in an lessened manner to such an extent that deterioration of emission does not occur. On the other hand, in the embodiment, the required drive force TP* is calculated as a value that changes without delay with respect to change in the accelerator position ACC. The first and second motor-generators 12, 13 are subjected to torque control such that the drive force of the vehicle becomes equal to the required drive force TP* (specifically, the final required drive force TPSM*). Therefore, although the engine torque TE changes after delay with respect to change in the required drive force TP*, the drive force of the vehicle changes in a manner following the change in the required drive force TP*. As a result, the control device for a hybrid vehicle according to the present embodiment limits deterioration of emission in the engine 11 without decreasing the responsivity of the drive force.

Specifically, even when the above-described gradual change process is performed to calculate the target torque TE*, an excessively sudden change in the accelerator position ACC may hamper sufficient lessening of change in the target torque TE* and thus temporarily destabilize the air-fuel ratio of the engine 11. To solve this problem, in the present embodiment, the correcting process is carried out to limit such destabilization of the air-fuel ratio.

FIG. 6 represents changes in the accelerator position ACC, the target torque TE*, and the detected air-fuel ratio AF in the control device of the present embodiment in a case in which the drive force increases in response to abrupt depression of the accelerator pedal and the air-fuel ratio of the engine 11 becomes destabilized. Specifically, the graph also represents, by broken lines, changes in the target torque TE* and the detected air-fuel ratio AF in a case in which the target torque TE* is set without being subjected to the correcting process.

With reference to FIG. 6, at Time t1 when the target torque TE* is increasing in response to depression of the accelerator pedal, the difference between the target air-fuel ratio AFT and the detected air-fuel ratio AF becomes greater than or equal to the predetermined value $\alpha$. At time t2, the aforementioned difference becomes smaller than the value $\alpha$. In the present embodiment, in the period from Time t1 to Time t2, the constant K, which is used to calculate the target torque TE*, is set to a value greater than a normal value through the correcting process. Therefore, in the period from Time t1 to Time t2, the target torque TE* is determined as a value with limited change compared to a normal value. This lessens change in the engine torque TE, thus limiting destabilization of the air-fuel ratio.

Specifically, in the present embodiment, the power managing ECU 30 executes a process as a required drive force calculating section through a required drive force calculating process (S100) and a process as a required torque calculating section through a required torque calculating process (S130). Also, the power managing ECU 30 performs a process as a gradual change processing section through the gradual change process (S150) and a process as a correction processing section through the correcting process (S160).

The present embodiment may be modified as follows. Further, the present embodiment and the following modifications can be combined as long as the combined modifications remain technically consistent with each other.

In the present embodiment, by updating the target torque TE* for the engine 11 using the equation (1), the target torque TE* is determined as a value obtained by subjecting the required torque TEF* to the gradual change process to lessen change in the target torque TE*. Alternatively, as long as the target torque TE* is determined as a value with lessened change compared to the required torque TEF*, the target torque TE* may be calculated in any other manner than the aforementioned manner in the gradual change process.

In the present embodiment, the correcting process changes the constant K in two different manners depending on whether the difference in the air-fuel ratio is smaller than the predetermined value $\alpha$ or greater than or equal to the value $\alpha$. Alternatively, the constant K may be changed, depending on the aforementioned difference, in three different manners or in a continuous manner.

In the present embodiment, the correcting process is carried out by changing the constant K, which is used to calculate the target torque TE*, in correspondence with the difference between the target value and the detection value of the air-fuel ratio of the engine 11. However, the correcting process may be performed in any other manner than the aforementioned manner. In other words, any other process can be employed as the correcting process, as long as the process corrects the target torque TE* in correspondence with the difference in the air-fuel ratio such that change in the target torque TE is lessened when the difference is great compared to when the difference is small. For example, a process in which the target torque TE* is manipulated directly in correspondence with the difference in the air-fuel ratio may be employed as the correcting process.

The target torque TE* may be calculated without being subjected to the correcting process in correspondence with the difference in the air-fuel ratio.

In the present embodiment, the second motor torque command TM2* is calculated based on the final required drive force TPSM*, which is obtained by subjecting the required drive force TP* to the shock lessening process. Alternatively, the second motor torque command TM2* may be calculated based on the required drive force TP* without performing the shock lessening process.

The control device of the present embodiment is employed in a hybrid vehicle that includes the engine 11 and the first and second motor-generators 12, 13 as drive sources for traveling. Alternatively, the control device may be employed in a hybrid vehicle having a differently configured drive system, as long as the vehicle includes an engine and a motor as drive sources for traveling.

The control device that implements the above-described various control sections can be constructed by a device that an ECU executing software processing, but is not limited to this configuration. For example, at least part of the processes executed by the software in the above-described embodiments may be executed by hardware circuits dedicated to execution of these processes (such as ASIC). That is, the controller may be modified as long as it has any one of the following configurations (a) to (c). (a) A configuration including a processor that executes all of the above-described processes according to programs and a program storage device such as a ROM (including a non-transitory computer readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

The invention claimed is:

1. A control device for a hybrid vehicle, the hybrid vehicle including an engine and a motor as drive sources for traveling, the control device comprising:
processor circuitry configured to:
calculate a required drive force based on an accelerator position;
calculate a required torque of the engine based on the required drive force;
calculate a target torque for the engine by subjecting the required torque to a reduction value based on a difference between a detected air-fuel ratio and a target air-fuel ratio, wherein the reduction value has a first value in response to the difference being greater than or equal to a threshold, the reduction value has a second value in response to the difference being less than the threshold, and the second value is less than the first value;
perform an engine control such that an engine torque becomes equal to the target torque; and
perform a torque control on the motor such that a drive force of the hybrid vehicle becomes equal to the required drive force in a state in which the engine torque is equal to the target torque, wherein performing the torque control comprises guarding against a rate of change of the required drive force exceeding a threshold to lessen a shock.

2. The control device according to claim 1, wherein the processor circuitry is further configured to:
calculate a target engine speed of the engine based on the required drive force.

3. The control device according to claim 2, wherein the motor includes a first motor generator and a second motor generator, and the processor circuitry is further configured to:
calculate a torque of the first motor generator necessary for causing an engine speed of the engine to reach the target engine speed as a first motor torque command, and calculate a torque of the second motor generator based on the guarding of the rate of change of the required drive force to lessen the shock.

4. The control device according to claim 1, wherein the processor circuitry is configured to:
calculate the target torque using the following equation:

$$TE^*[i]=\{TEF^*+(K-1)TE^*[i-1]\}/K$$

where $TE^*[i]$ is an updated value of the target torque, $TEF^*$ is the required torque, K is a constant, and $TE^*[i-1]$ is a pre-update value of the target torque.

5. The control device according to claim 4, wherein the processor circuitry is configured to:
set K to the first value in response to the difference being greater than or equal to the threshold, and
set K to the second value in response to the difference being less than the threshold.

6. A control method for a hybrid vehicle, the hybrid vehicle including an engine and a motor as drive sources for traveling, the control method comprising:
calculating, by processor circuitry, a required drive force based on an accelerator position;
calculating, by the processor circuitry, a required torque of the engine based on the required drive force;
calculating, by the processor circuitry, a target torque for the engine by subjecting the required torque to a gradual change process for lessening a change in a value, wherein the gradual change process has a higher magnitude in reducing a change of the target torque in response to a difference between a detected air-fuel ratio and a target air-fuel ratio being equal to or greater than a threshold, and the gradual change process has a lower magnitude in reducing the change in response to the difference being less than the threshold;
performing, by the processor circuitry, an engine control such that an engine torque becomes equal to the target torque; and
performing, by the processor circuitry, a torque control on the motor such that a drive force of the hybrid vehicle becomes equal to the required drive force in a state in which the engine torque is equal to the target torque, wherein performing the torque control comprises guarding against a rate of change of the required drive force exceeding a threshold to lessen a shock.

7. The control method according to claim 6, further comprising calculating a target engine speed of the engine based on the required drive force.

8. The control method according to claim 7, wherein the motor includes a first motor generator and a second motor generator, and the method further comprises:
calculating a torque of the first motor generator necessary for causing an engine speed of the engine to reach the target engine speed as a first motor torque command, and
calculating a torque of the second motor generator based on the guarding of the rate of change of the required drive force to lessen the shock.

9. The control method according to claim 6, wherein calculating the target torque comprises using the following equation:

$$TE^*[i]=\{TEF^*+(K-1)TE^*[i-1]\}/K$$

where $TE^*[i]$ is an updated value of the target torque, $TEF^*$ is the required torque, K is a constant, and $TE^*[i-1]$ is a pre-update value of the target torque.

10. The control method according to claim 9, wherein calculating the target torque comprises:

setting K to a first value in response to the difference being greater than or equal to the threshold, and setting K to a second value in response to the difference being less than the threshold, wherein the second value is less than the first value.

11. A non-transitory computer-readable medium that stores a program that causes processor circuitry to perform a control process for a hybrid vehicle, the hybrid vehicle including an engine and a motor as drive sources for traveling, the control process comprising:

calculating, by the processor circuitry, a required drive force based on an accelerator position;

calculating, by the processor circuitry, a required torque of the engine based on the required drive force;

calculating, by the processor circuitry, a target torque for the engine by subjecting the required torque to a gradual change process for lessening a change in a value;

updating the target torque in response to (1) a difference between a detected air-fuel ratio and a target air-fuel ratio transitioning from greater than or equal to a threshold to less than the threshold or (2) the difference between the detected air-fuel ratio and the target air-fuel ratio transitioning from less than the threshold to greater than or equal to the threshold;

performing, by the processor circuitry, an engine control such that an engine torque becomes equal to the updated target torque; and performing, by the processor circuitry, a torque control on the motor such that a drive force of the hybrid vehicle becomes equal to the required drive force in a state in which the engine torque is equal to the updated target torque, wherein performing the torque control comprises guarding against a rate of change of the required drive force exceeding a threshold to lessen a shock.

12. The non-transitory computer-readable medium according to claim 11, wherein the control process further comprises calculating a target engine speed of the engine based on the required drive force.

13. The non-transitory computer-readable medium according to claim 12, wherein the motor includes a first motor generator and a second motor generator, and the control process further comprises:

calculating a torque of the first motor generator necessary for causing an engine speed of the engine to reach the target engine speed as a first motor torque command, and calculating a torque of the second motor generator based on the guarding of the rate of change of the required drive force to lessen the shock.

14. The non-transitory computer-readable medium according to claim 11, wherein updating the target torque comprises using the following equation:

$$TE^*[i]=\{TEF^*+(K-1)TE^*[i-1]\}/K$$

where $TE^*[i]$ is an updated value of the target torque, $TEF^*$ is the required torque, K is a constant, and $TE^*[i-1]$ is a pre-update value of the target torque.

15. The non-transitory computer-readable medium according to claim 14, wherein updating the target torque comprises:

setting K to a first value in response to the difference being greater than or equal to the threshold, and setting K to a second value in response to the difference being less than the threshold, wherein the second value is less than the first value.

* * * * *